March 3, 1959 W. A. CHARBONNEAUX ET AL 2,876,406
SPEED CONTROL FOR ELECTRIC MOTORS Filed April 5, 1956 4 Sheets-Sheet 1

INVENTORS
WILSON A. CHARBONNEAUX
JOHN J. VELESKY
BY

ATTY.

March 3, 1959
W. A. CHARBONNEAUX ET AL
2,876,406
SPEED CONTROL FOR ELECTRIC MOTORS
Filed April 5, 1956
4 Sheets-Sheet 3
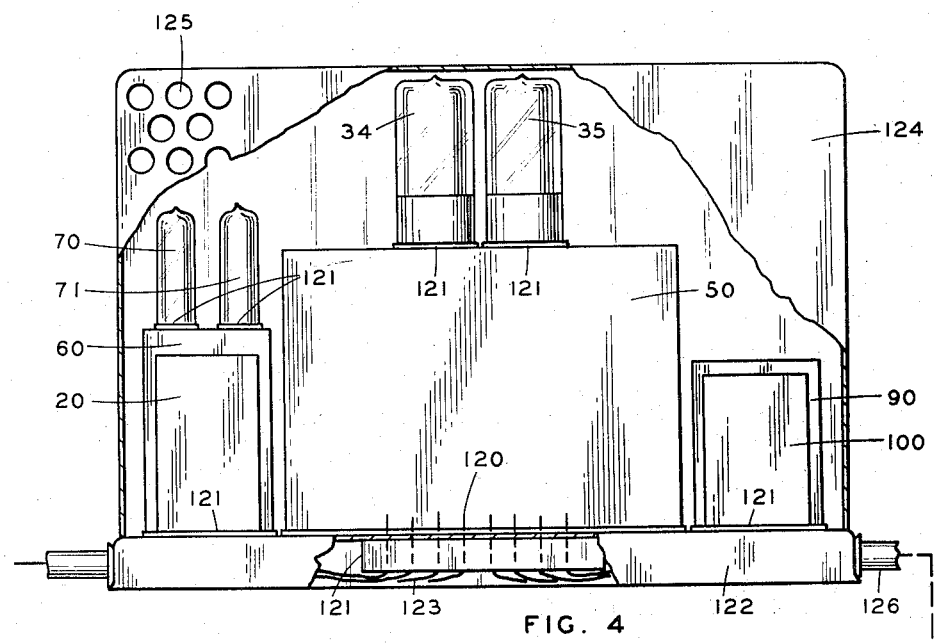
FIG. 4
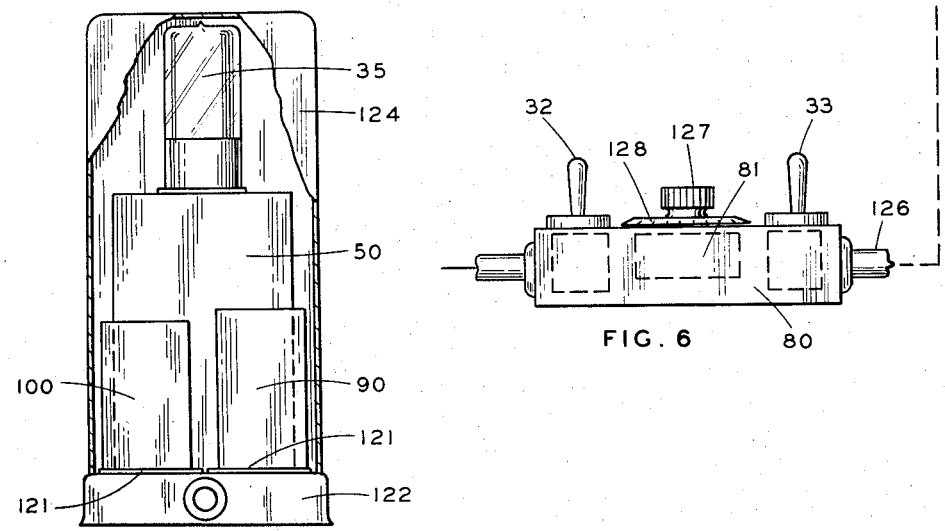
FIG. 5
FIG. 6
INVENTORS
WILSON A. CHARBONNEAUX
JOHN J. VELESKY
BY
ATTY.

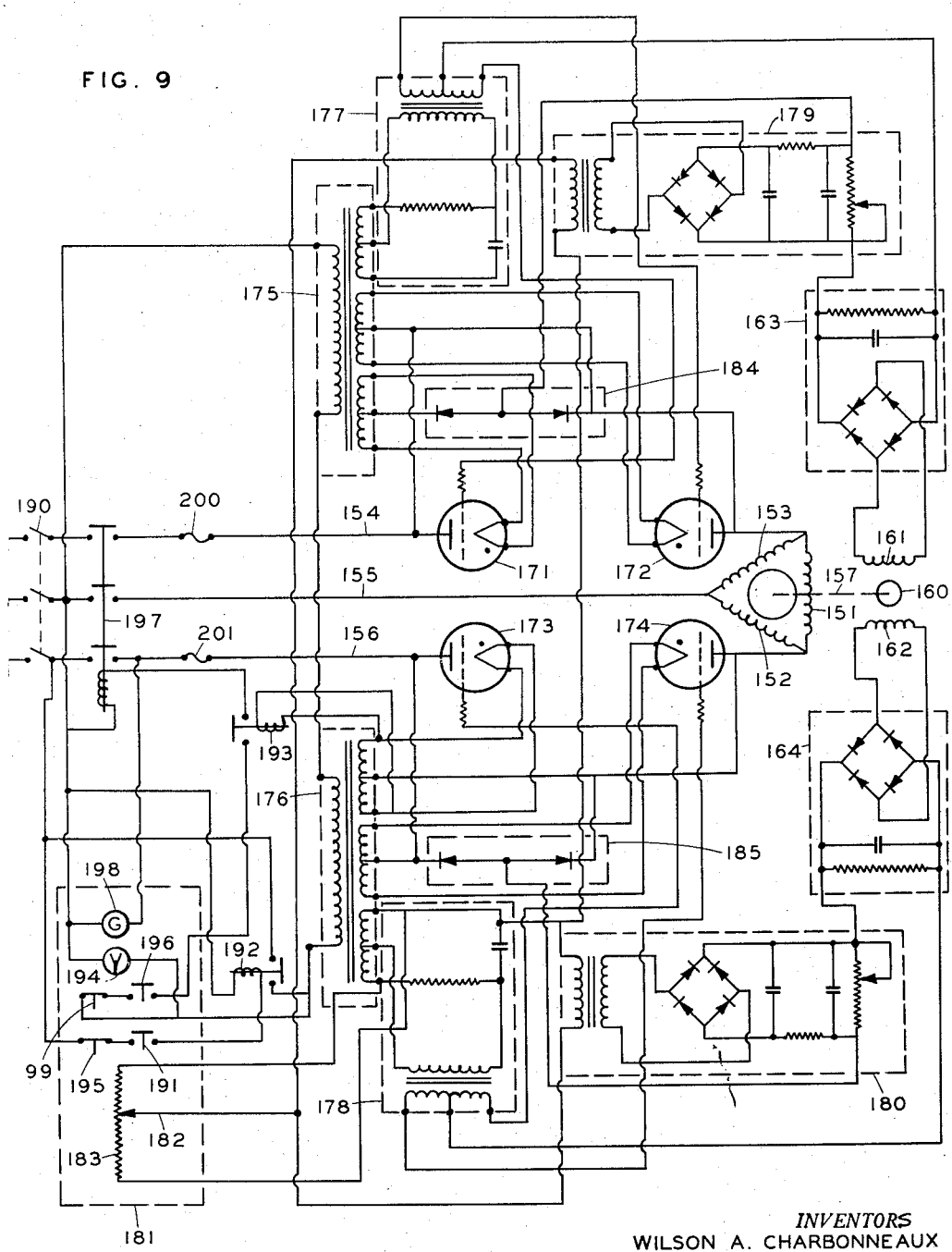

2,876,406
SPEED CONTROL FOR ELECTRIC MOTORS

Wilson A. Charbonneaux and John J. Velesky, Dayton, Ohio, assignors to WacLine, Inc., Dayton, Ohio, a corporation of Ohio Application April 5, 1956, Serial No. 576,401

11 Claims. (Cl. 318—227)

This invention relates to speed controls for electric motors and, more particularly, to speed controls for alternating-current motors of the induction type.

A principal object of the invention is to provide a method of speed control for induction type alternating-current motors which will cause the motor to develop high torque at reduced motor speeds.

Another object of the invention is to provide a speed control for alternating-current motors of the induction type which will maintain the speed of the motor at a preselected value over a comparatively wide variation in torque output of the motor.

Still another object of the invention is to provide a speed control for alternating-current motors of the induction type whereby the torque output of the motor may be maintained substantially constant over a wide range of speed.

And still another object of the invention is to provide a speed control for alternating-current motors of the induction type which is economical of manufacture, efficient in use, and which may be serviced by personnel of limited training and experience.

Generally, the present invention utilizes a multi-pole tachometer generator, the rotating element of which is mechanically connected to the rotating element of the motor the speed of which is to be controlled. The alternating-current voltage produced by such a generator is a function of its speed and the value of this voltage at any instant is indicative of the speed of generator, and consequently, of the speed of the motor. This alternating voltage is rectified in a suitable rectifier and this rectified voltage is balanced against a preselected reference voltage so that any variation in the value of the tachometer voltage, as a consequence of variation in speed of the motor, will produce a differential voltage which is applied in a regulating circuit to actuate suitable means, for example, thermionic tubes, so as to maintain the speed of the motor substantially at the preselected value.

Referring now to the drawings in which like reference characters designate like parts throughout, and which illustrate practical embodiments of the invention:

Fig. 4 is a side view of one embodiment of the invention with certain parts broken away;

Fig. 5 is an end view of the apparatus shown in Fig. 4, with certain parts broken away;

Fig. 6 is a side view of one unit of the apparatus;

Fig. 9 is a schematic diagram showing a modified embodiment of the invention.

Figure 1:
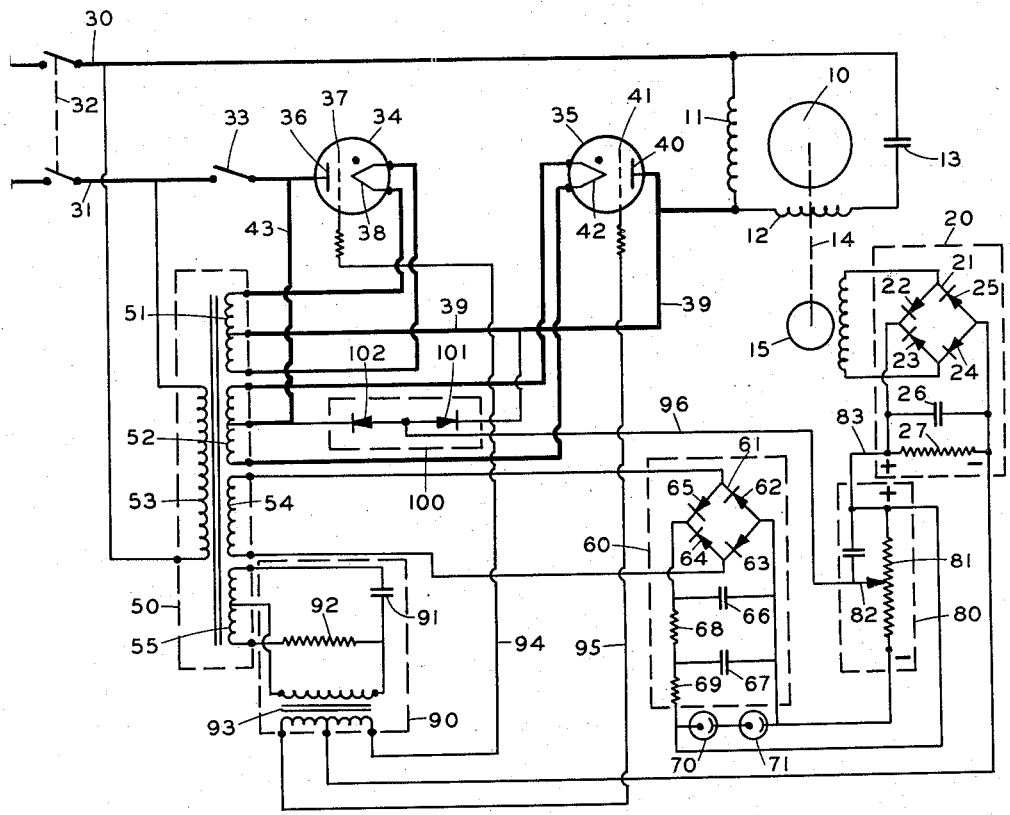
Fig. 1 is a schematic diagram of a motor speed control illustrating one embodiment of the invention.

The speed control, illustrated schematically in Fig. 1, is designed to control the speed of an induction motor designated generally by the numeral 10 and including windings 11 and 12 which are offset from each other by substantially 90 electrical degrees by means of capacitor 13. Furthermore, the speed control, as will become evident hereinafter, is capable of maintaining the motor 10 very precisely at any selected speed within a rather wide range, the upper limit of which is somewhat below the top speed which would be attained by the motor 10 when running free on full line voltage. Mechanically connected to the rotating element of motor 10, preferably through a direct-coupled shaft 14, but also by any other means whereby a fixed speed ratio may be obtained, is a tachometer generator 15, the output of which is fed into a tachometer filter circuit designated generally by the numeral 20. This circuit contains a recitfier bridge 21 having rectifiers 22, 23, 24 and 25, and capacitor 26 and resistor 27 adapted to filter out ripples in the rectified tachometer output, so that a smooth rectified voltage is obtained, the value of which is a function of the speed of motor 10.

The windings 11 and 12 of motor 10 are connected to a suitable source of electrical power by means of conductors 30 and 31, and a main switch 32. Interposed in the line between the motor 10 and the source of electrical power, that is to say, in the conductor 31 are a start-switch 33 and two thermionic tubes 34 and 35, the latter being of any suitable type, such as, for example, the type commonly designated as "thyratrons," and having a current-carrying capacity sufficient to supply the maximum current required by motor 10. The thermionic tubes 34 and 35 are so connected that, when plate 36 of tube 34 is positive with respect to the line voltage and grid 37 is at the proper potential, current will flow from plate 36 to cathode 38, through conductor 39 to the motor windings 11 and 12, and cause motor 10 to rotate. When the potential of plate 36 drops to zero or becomes negative, tube 34 will cease to conduct current and the motor windings 11 and 12 will not be energized. On the following half-cycle, plate 40 of tube 35 is positive with respect to the line voltage, and when grid 41 is at the proper potential, current will flow from conductor 30, through windings 11 and 12, from plate 40 to cathode 42, and through conductor 43 to conductor 31. Thus, current is supplied to the motor windings during one half-cycle by tube 34 and during the other half-cycle by tube 35, the portion of each half-cycle during which current is supplied to the windings being determined by the respective grid-to-cathode potentials of tubes 34 and 35. By varying the portion of each half-cycle during which current is supplied to the motor windings, the speed of the motor can be varied as required.

Cathodes 38 and 42 are heated by current supplied by a transformer designated generally by the numeral 50 having a plurality of windings thereon, of which windings 51 and 52 supply heating current to the tube cathodes 38 and 42. A primary winding 53 is connected across lines 30 and 31 so that transformer 50 is energized when switch 32 is closed. Because tubes 34 and 35 may be damaged if current is drawn through them before the cathodes 38 and 42 have reached operating temperature, switch 33 is provided, and this switch should not be closed until a sufficient time for heating of cathodes has elapsed. If desired, a thermal time-delay relay or any other suitable time-delay device may be substituted for switch 33.

Transformer 50 is provided with a winding 54 which is connected to a reference voltage circuit designated generally by the numeral 60 consisting of a rectifier bridge 61 containing rectifiers 62, 63, 64, and 65, capacitors 66—67, and resistors 68—69, the arrangement being such that alternating voltage from winding 54 is rectified and filtered to produce a substantially constant reference voltage. In order that the reference voltage will remain at a constant value irrespective of variations in line voltage, voltage-regulator or "glow tubes" 70—71 are provided and are connected as shown, this arrangement being well known in the art.

The output of the reference voltage circuit is connected to a potentiometer unit designated generally by the numeral 80, consisting of a potentiometer 81 which is connected across the output of the reference voltage circuit 60, the positive terminal of which is connected at 83 to the positive output terminal of the tachometer voltage circuit 20.

Transformer 50 is provided with a winding 55 the output of which is connected to a phase-shift circuit designated generally by the numeral 90 consisting of a capacitor 91, a resistor 92, and a transformer 93, so connected that the output voltage of transformer 93 is caused to lag the line voltage by approximately 90 electrical degrees. The center-tap of the output winding of transformer 93 is connected to the negative terminal of tachometer circuit 20, and the ends of the output windings are connected to grids 37 and 41 respectively of tubes 34 and 35 by means of conductors 94 and 95.

The movable arm 82 of potentiometer 81 is connected by means of conductor 96 to a diode unit, designated generally by the numeral 100, which contains a diode 101 connected to the cathode of tube 34 and a diode 102 connected to the cathode of tube 35. The diodes 101 and 102 may be of any suitable type, such as of germanium or silicon, which will offer a high resistance to flow of line current from plate to plate of the tubes, but which will present a low resistance in the opposite direction to the flow of control current. The arrangement is such that when the plate 36 of the tube 34 is positive with respect to the line voltage, the combined voltage output of transformer 93 and the differential voltage of potentiometer 80 is applied across the grid and cathode of tube 34; and when the plate 40 of tube 35 is positive with respect to the line voltage, the combined voltages are applied across the grid and cathode of tube 35.

Operation of the invention can be described by reference to Fig. 2 where the curve 110 represents the voltage applied to lines 30—31, the curve 111 represents the critical grid-to-cathode voltage of tubes 34 and 35, that is, the grid-to-cathode voltage required to make the tube "fire" or conduct current from the plate to cathode. The curve 112 represents the differential voltage supplied by potentiometer 80 and curve 113 represents the voltage supplied by the phase-shift circuit 90. Thus, when the voltage applied across the grid and cathode reaches a value equal to that indicated by $E_f$ that tube having a positive plate voltage will conduct current, and will continue to conduct until the plate voltage falls to substantially zero. On the succeeding half-cycle the other tube will conduct when the grid-to-cathode voltage reaches a value of $E_f$ and will conduct until the plate voltage reaches substantially zero. The shaded areas in Fig. 2 represent the time during each portion of the cycle that the tubes conduct current.

Figure 3:
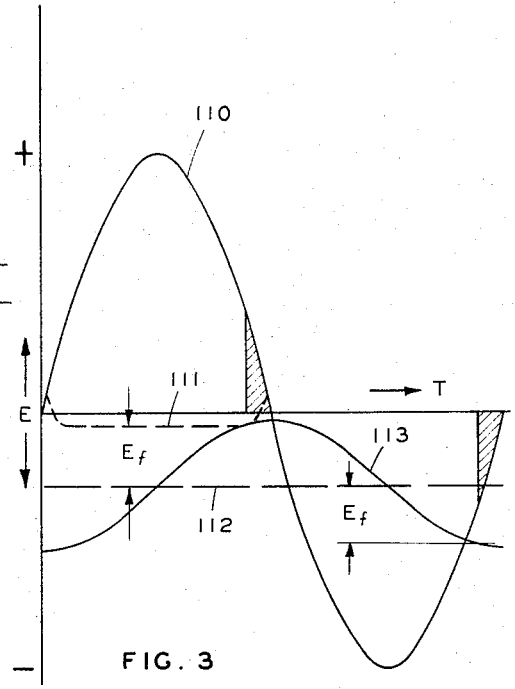
Fig. 3 is a graph illustrating the relationship of certain voltages occurring in the circuit.

Should the speed of the motor increase above the preselected value as determined by the setting of the movable arm 82 of potentiometer 81, the voltage output of tachometer circuit 20 will increase proportionately, and the differential voltage supplied by potentiometer 80 will increase in the negative direction as indicated by the curve 112 in Fig. 3. Thus, the grid-to-cathode voltage 113 will reach the critical grid voltage 111 at a later time in the cycle, and the tube will conduct for a lesser portion of the cycle, as indicated by the shaded area of Fig. 3. Should the speed of the motor decrease the differential voltage represented by curve 112 will become less negative, the grid-to-cathode voltage will reach the critical value earlier in the cycle, and the tubes will conduct over a greater portion of the cycle.

Figure 2:
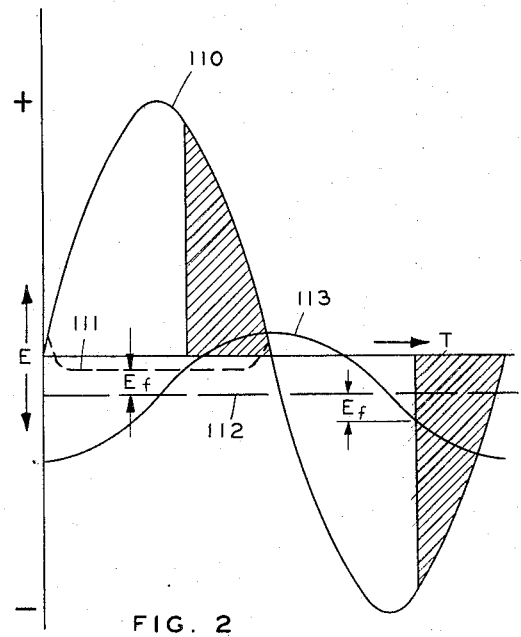
Fig. 2 is a graph illustrating the relationship of certain voltages occurring in the circuit.

The quantity of electrical energy supplied to the motor is a function of the time each tube conducts current, and this energy may be represented by the shaded area of Figs. 2 and 3. If the speed of the motor increases above the preselected speed, less electrical energy is supplied to the motor, and as a consequence, the speed of the motor drops toward the preselected value; if the speed of the motor decreases below the preselected speed, more electrical energy is supplied to the motor, and as a consequence, the speed of the motor increases toward the preselected speed.

If the speed of the motor is to be closely controlled over a wide range, for example, from rated speed to one-fiftieth of rated speed, such as from 1650 R. P. M. to 33 R. P. M., the "firing" of the tubes must be accurately controlled over a range of from substantially a complete half-cycle to a very small portion of a half-cycle. The present invention secures accurate firing of the tubes by a close control of the grid-to-cathode potential of each tube, such control being insured by diodes 100. The diodes 100 prevent flow of line current from the plate of one tube to the plate of the other tube, but permit the flow of sufficient control current to maintain the grid-to-cathode potential at the value required for close control of tube firing.

One practical embodiment of the invention, though not necessarily the preferred embodiment, is illustrated in Figs. 4, 5, and 6. The several circuits designated by the numerals 20, 50, 60, 90, and 100 may be assembled in a unit structure and sealed with a suitable sealing material in a manner well known in the art and generally referred to as "potting." These "potted" units are provided with terminal prongs 120 adapted to fit into suitable socket members or receptacles 121 supported on a chassis 122, the proper connections to the several terminals of the different units being made by means of conductors 123. Thus, in the event of failure of any unit, the defective unit may be readily removed and replaced by a new unit, and such maintenance can be done by personnel having relatively limited training or skill. A cover 124 provided with ventilation openings 125 is removably secured to chassis 122 in any desired manner.

The potentiometer unit 80 may be mounted on the cover 124 or it may be assembled as a separate unit as illustrated in Fig. 6, which unit may be installed in any desired location remote from the control unit and connected thereto by means of suitable conductors 126. If desired, the switches 32—33 may be installed in this unit, or they may be located elsewhere and operated by means of push-buttons installed in the unit. The speed of the motor may be preselected by rotation of a knob 127 having suitable markings 128 thereon, and the control will maintain the preselected speed of the motor as described above.

Figure 7:
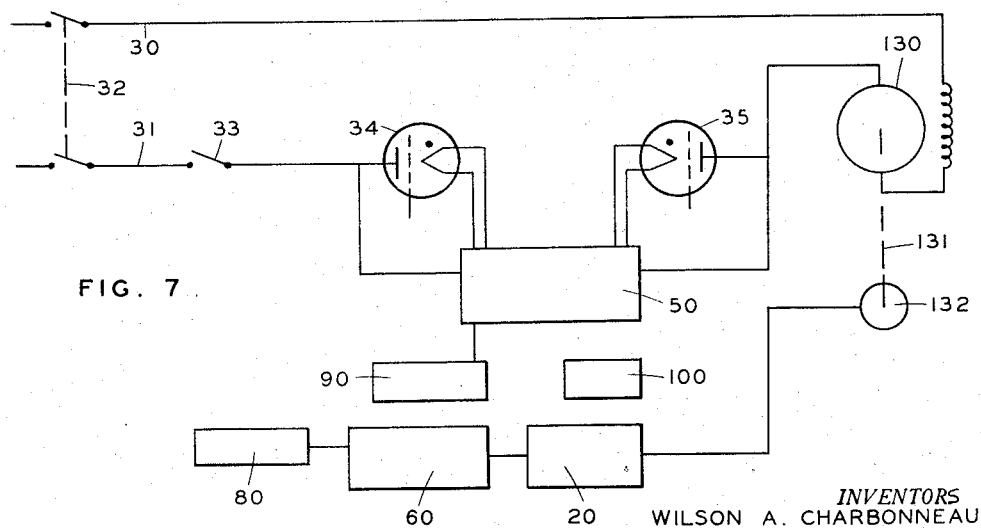
Fig. 7 is a schematic diagram showing a modification of the diagram illustrated in Fig. 1.

While the present invention is particularly effective in the control of speed of alternating-current motors of the induction type, the speed of alternating-current motors of other types may be controlled also, as indicated in Fig. 7. For purposes of illustration, a motor of the series type, generally called a "universal" motor, designated by the numeral 130, may be used. Mechanically attached to the rotating element of motor 130, as by means of a direct-coupled shaft 131 is a tachometer generator 132, the output of which is fed into a control circuit composed of the several units described and illustrated in Fig. 1. Operation of the speed control for this motor is similar to that described above for the induction-type motor.

Figure 8:
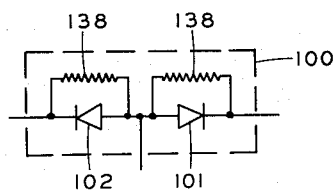
Fig. 8 is a schematic diagram showing a modification of the diode circuit illustrated in Fig. 1.

The effectiveness of motor speed control, particularly at very low motor speeds, depends to a large degree upon the control of grid-to-cathode potential applied to the thermionic tubes. Under some conditions, particularly where the grid-to-cathode control circuit contains some capacitance, resistors 138, each having a value of about one megohm of resistance, may be connected across diodes 101—102, as shown in Fig. 8, which resistors will materially assist in maintaining the grid-to-cathode potential at the desired value.

The speed control described above may be readily applied to polyphase alternating-current motors as illustrated schematically in Fig. 9. Such a speed control comprises a motor 150, shown for purposes of illustration as being of the three-phase type, having windings 151, 152, and 153 offset from each other by substantially 120 electrical degrees, and adapted to be supplied with three-phase alternating current through conductors 154, 155, and 156. Mechanically connected to the rotating element of motor 150 by any means whereby a fixed speed ratio is obtained, preferably by means of a shaft 157, is a tachometer generator 160. The tachometer generator 160 is fitted with two windings 161 and 162, the output of which is fed into tachometer circuits 163 and 164, respectively. These tachometer circuits 163 and 164 are substantially identical to the tachometer circuit 20 described above.

Thermionic tubes 171 and 172 are connected in the circuit of conductor 154, and thermionic tubes 173 and 174 are connected in the circuit of conductor 156, as described above for thermionic tubes 34 and 35. The cathodes of tubes 171 and 172 are heated by current supplied by transformer 175, and the cathodes of tubes 173 and 174 are heated by current supplied by transformer 176. Phase-shift circuits 177 and 178, reference voltage circuits 179 and 180, and diode circuits 184 and 185, each circuit being similar in construction to the phase-shift circuit 90, the reference voltage circuit 60, and the diode circuit 100 described above, are provided. A control unit 181, similar to control unit 80, is provided, and this control unit is fitted with such apparatus that all operating functions of the motor may be controlled from this station. The several units of this apparatus may be "potted" and mounted as described above, and the control unit may be mounted at the operator's station or at any other desired location.

Operation of this speed control can be described by reference to the schematic diagram shown in Fig. 9. Motor speed may be preselected by positioning the movabel arm 182 of potentiometer 183 at the desired setting. Movement of switch 190 to the closed position supplies current to control unit 181, and operation of "Start" push-button 191 actuates relay 192 to energize transformers 175 and 176. These transformers supply heating current to the cathodes of tubes 171, 172, 173, and 174, and, because these tubes may be damaged if current is passed through them when their cathodes are below proper operating temperature, a time-delay relay 193 is connected to the heating circuit of one of the tubes, such as that of tube 173. This relay 193 may be of the thermal type, or of any other suitable type which will not close until a sufficient time has elapsed to insure that the tubes have reached operating temperature. A lamp having a distinctive color, for example, yellow, is connected so as to light when contacts of relay 192 are closed, thus indicating that the filament transformers are energized. A "Stop" push-button 195 is provided, actuation of which causes relay 192 to open and de-energize the transformers.

When sufficient time has elapsed for the tube cathodes to reach operating temperature, a "Start" push-button 196 may be actuated, and, if contacts of relay 193 are closed, contactor 197 will close and apply current to motor 150. When the contacts of contactor 197 close, a lamp 198 having a distinctive color, such as green, is lighted, indicating that the motor is energized. Actuation of a "Stop" push-button 199 will cause contactor 197 to open and de-energize the motor. Suitable overload relays 200—201 are provided to protect the motor and tubes in the event that excessive currents are drawn through conductors 154 and 156.

The speed of motor 150 may be varied as desired at any time by changing the position of the movable arm 182 of potentiometer 183, and the motor will maintain this preselected speed as described above. While the invention is described and illustrated as being composed of "potted" units, it is understood that the several units may be assembled and constructed in any other suitable manner.

It should be understood that changes and modifications in the form, construction, arrangement, and combination of the several parts of the speed control for electric motors may be made and substituted for those herein shown and described without departing from the nature and principle of our invention.

Having thus described our invention, what we claim and desire to secure by Letters Patent is:

1. A speed control for alternating-current motors having a plurality of field windings which are suitably connected to an electric supply line, said speed control comprising means mechanically connected to the motor for generating a speed-responsive voltage which is a function of the speed of said motor, speed-selecting means including a source of adjustable reference voltage connected so as to oppose the speed-responsive voltage and thereby produce a differential voltage which is the algebraic sum of the said speed-responsive voltage and the said adjustable reference voltage, means for producing a phase-shifted alternating voltage and imposing this voltage upon the said differential voltage, thermionic tube means connected in series with said motor windings, means including two diodes operatively connected for applying the said superimposed voltage across the grid and cathode of said thermionic tube means so as automatically and intermittently to interrupt the flow of electrical energy supplied to the windings whereby to maintain the preselected speed of the said motor substantially constant.

2. A speed control for alternating-current motors having a plurality of windings which are connected to an electric supply line, said speed control comprising means mechanically connected to the motor for generating a speed-responsive voltage which is a function of the speed of said motor, speed-selecting means including a source of adjustable reference voltage connected so as to oppose the speed-responsive voltage and thereby produce a differential voltage which is the algebraic sum of the said speed-responsive voltage and the said adjustable reference voltage, means for producing a phase-shifted alternating voltage and imposing this voltage upon the said differential voltage, pairs of thermionic tubes connected in anti-parallel relationship in series with said motor windings, diode means connecting the cathodes of each pair of said thermionic tubes, and means for applying the said superimposed voltage through the diode means across the grid and cathode of each thermionic tube means so as automatically and intermittently to interrupt the flow of electrical energy supplied to said windings.

3. A speed control for an alternating-current motor having a pair of windings offset from each other by approximately 90 electrical degrees, said control being adapted for maintaining the motor at a preselected speed within precise limits and comprising means mechanically connected to the motor for generating a speed-responsive voltage which is a function of the speed of said motor, a source of reference voltage having a potentiometer means connected thereacross to produce a selected reference voltage to oppose the speed-responsive voltage and thereby produce a differential voltage which is the algebraic sum of the said selected reference voltage and the said speed-responsive voltage, means for producing an alternating voltage which is shifted in phase relative to the voltage applied to said motor, means for imposing the said phase-shifted voltage upon the said differential voltage, pairs of thyratron tubes connected in series with said motor windings so as to supply current to the motor windings during a portion of each cycle of the applied voltage, diode means for connecting together the cathodes of said thyratron tubes, and means for applying the said differential and imposed voltage through the diode means across the grid and cathode of each said thyratron tubes.

4. A speed control for an alternating-current induction motor having a plurality of stator windings, a tachometer generator mechanically connected to the rotor of said induction motor and adapted to generate a voltage proportional to the speed of rotation of said motor, a source of reference voltage connected in opposition to said tachometer voltage so as to provide a differential having a plurality of windings offset at substantially 120 generator voltage and the reference voltage, means for varying the differential voltage, a source of alternating voltage connected for superimposition upon the differential voltage, thermionic tube means connected in series with at least one of the said stator windings, and means including two diodes operatively connected for applying the said superimposed voltage across the grids and cathodes of said thermionic tube means so as to cause the thermionic tube means to supply energy to the motor windings in pulses sufficient to maintain the motor at the preselected speed.

5. A speed control for an alternating-current motor having a plurality of windings offset at substantially 120 electrical degrees from each other and being connected across a three-phase line, said speed control comprising means mechanically connected to the motor for generating speed-responsive voltages which are functions of the speed of said motor, a source of adjustable reference voltages connected so as to oppose the speed-responsive voltages and thereby produce differential voltages which are respectively the algebraic sum of the said adjustable reference voltages and the said speed-responsive voltages, means for adjusting said reference voltages, means for producing alternating voltages which are shifted in phase relative to the voltages applied to the windings of said motor, means for imposing the said phase-shifted voltages respectively upon the said differential voltages, thermionic tube means interposed in said line in series with at least one of said motor windings, each thermionic tube means including pairs of thyratron tubes to switch the current to the motor windings during a portion of each cycle of the applied voltages, diode means for connecting together the cathodes of each pair of thyratron tubes, and means for applying the said superimposed voltages respectively through the diode means to the grid and cathode of each pair of thyratron tubes, so as intermittently to supply electrical energy to the said motor windings in pulses sufficient to maintain the preselected speed of the motor substantially constant.

6. A speed control for a three-phase alternating-current induction motor having a rotor and a plurality of stator windings, a tachometer generator connected to the rotor of said induction motor and adapted to generate voltages proportional to the speed of rotation of said rotor, reference voltage networks having outputs connected in opposition to said tachometer voltages so as to provide differential voltages which are the algebraic sum of the tachometer generator voltages and the reference voltages, means for varying the reference voltages in order to select a predetermined speed, thermionic tube means connected in series with said stator windings, a source of alternating voltages connected between the grid of each tube and the reference voltage networks so that said alternating voltages are superimposed upon the differential voltages, and means including two diodes operatively connected for applying the said differential and superimposed voltages across the grids and cathodes of said thermionic tube means so as to cause the thermionic tube means to supply energy to the motor windings in pulses sufficient to maintain the motor at the preselected speed.

7. In a motor speed control circuit for accurately controlling the operation of a pair of thermionic tubes connected in anti-parallel relationship, a component consisting of a plurality of diodes connecting together the cathodes of each thermionic tube and a resistor connected across each diode, and means for applying a predetermined voltage of proper polarity through the said diode and resistor means to the grid and cathode of each tube in order to accurately control the operation of said tubes.

8. In a motor speed control circuit for accurately controlling the operation of a pair of thermionic tubes connected in anti-parallel relationship, a component consisting of diode means connecting together the cathodes of each thermionic tube and a resistor connected across each diode, and means for applying a predetermined voltage of proper polarity through the said diode and resistor means to the grid and cathode of each tube in order to accurately control the operation of said tubes.

9. A speed control for an induction motor having a plurality of stator windings connected through line conductors to a source of alternating supply current, said speed control comprising a tachometer generator operatively connected to the motor for generating an electric current having speed-responsive voltages which are proportional at all times to the speed of the motor, reference voltage networks for producing stable reference voltages, means associated with the reference voltage networks for varying the reference voltages, said reference voltage networks and tachometer generator being electrically connected so that the reference voltages and the speed-responsive voltages are opposed and thereby produce differential voltages which are the algebraic sum of the reference voltages and the speed-responsive voltages, at least one line conductor leading to each stator winding being interrupted by a break which is bridged by thermionic control means, said control means consisting of two thyratron tubes each having a plate, a cathode, and a grid, the plates of each tube being respectively connected to opposite sides of the break in said interrupted line conductor, the cathode of one tube being connected to the side of the interrupted line which is connected to the plate of the other tube and the cathode of the latter being connected to the other side of said interrupted line so that said tubes can respectively close the circuit through said interrupted line conductor on successive half-cycles of the supply current, means for superimposing the differential voltages across the grid and cathode of each tube so that the tubes will each conduct supply current for controlled periods of time during successive half-cycles, the duration of which periods will vary as the differential voltage varies.

10. A speed control for alternating-current motors which are connected through an electric supply line to a source of electric current, said speed control comprising means connected to the motor for producing a speed-responsive voltage which is a function of speed of the motor, speed-selecting means including a source of reference voltage connected so as to oppose the speed-responsive voltage and thereby produce a differential voltage which is the algebraic sum of the speed-responsive voltage and the reference voltage, means for producing a phase-shifted alternating voltage and imposing this voltage on said differential voltage, thermionic tube means interposed in the electric supply line and connected in series with the motor, and means including two diodes operatively connected for applying the said superimposed voltage across the grid and cathode of said thermionic tube means so as automatically and intermittently to interrupt the flow of electrical energy supplied to the motor whereby to maintain the speed of the motor substantially constant.

11. A speed control for alternating-current motors which are connected through an electric supply line to a source of electric current, said speed control comprising means connected to the motor for producing a speed-responsive voltage which is a function of speed of the motor, speed-selecting means including a source of reference voltage connected so as to oppose the speed-responsive voltage and thereby produce a differential voltage which is the algebraic sum of the speed-responsive voltage and the reference voltage, means for producing a phase-shifted alternating voltage and imposing this voltage on said differential voltage, a pair of thermionic tubes connected in antiparallel relationship in series with said motor, diode means connecting the cathodes of said tubes, and means for applying the said superimposed voltage through the diode means across the grid and cathode of each thermionic tube so as automatically and intermittently to interrupt the flow of electrical energy supplied to the motor.

References Cited in the file of this patent

UNITED STATES PATENTS

| | | |
|---|---|---|
| 1,376,453 | Meyer | May 3, 1921 |
| 2,264,333 | Satterlee | Dec. 2, 1941 |
| 2,329,127 | Levy | Sept. 7, 1943 |
| 2,448,793 | Glass | Sept. 7, 1948 |
| 2,473,838 | Aldrich | June 21, 1949 |